Feb. 16, 1943.   U. C. TAINTON   2,311,099
METAL TREATMENT
Original Filed Oct. 21, 1938
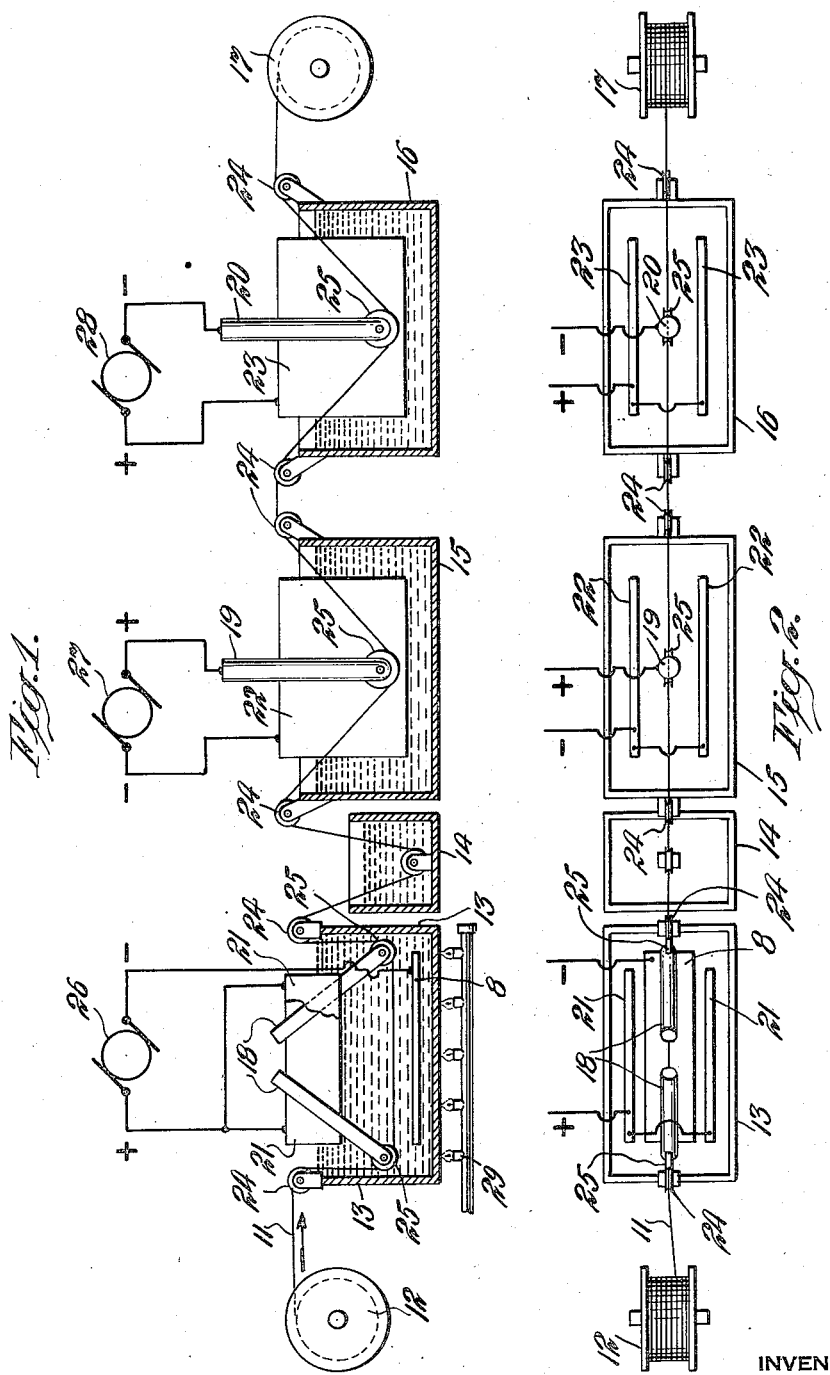
INVENTOR
U. C. TAINTON
BY
Edwards, Bower Wool
ATTORNEYS Patented Feb. 16, 1943

2,311,099

UNITED STATES PATENT OFFICE 2,311,099

METAL TREATMENT

Urlyn Clifton Tainton, Baltimore, Md.

Original application October 21, 1938, Serial No. 236,340. Divided and this application March 13, 1942, Serial No. 434,457

10 Claims. (Cl. 204—145)

My invention relates to the treatment of metal, particularly for the cleaning of the surface thereof. The invention is especially effective for removing rust, scale, carbon and slag from the surface of iron and steel, and is particularly applicable as a preliminary treatment to various coating operations, such as galvanizing, enameling, painting, electroplating or the like. The invention, however, as will later more fully appear, is not limited to the treatment of ferrous metal.

My invention comprises the step of subjecting the surfaces of metals to the reducing action of a metal more electropositive than the metal being treated, that is having a position in the electrochemical scale above that of the metal being treated. For example, when iron or steel is being treated it may be subjected to the action of sodium or calcium, which metals are considerably more electropositive than iron.

More specifically, my invention comprises the subjection of the metal article to be treated to the action of a more electropositive metal by a method in which the article is immersed in a bath comprising compounds of the more electropositive metals under such conditions that a more electropositive metal maintained in solution in said bath is active at the surface of the article.

In presenting this invention, a specific embodiment thereof will first be described, followed by illustrative modifications and an outline of the general principles upon which it rests.

Accordingly I shall first describe the cleaning of steel or iron wire as a step in the manufacture of electroplated zinc coated wire.

Referring to the drawing:

Fig. 1 is a diagrammatic elevation, more or less in section, of a system for cleaning and electroplating the wire; and Fig. 2 is a plan view of the system shown in Fig. 1.

Referring to Figs. 1 and 2, the wire 11 is fed continuously from reel 12 successively through cleaning tank 13, wash tank 14, anodic cleaning tank 15, and electroplating tank 16, to reel 17. Electrodes 8, 19 and 20 depend into tanks 13, 15 and 16 which also contain electrodes 21, 22 and 23, respectively. The wire runs over guide rolls 24 mounted on the tanks, and over guide rolls 25 mounted at the ends of holders 18 and of electrodes 19 and 20. The electrodes of the several tanks are connected to electric current sources 26, 27 and 28, respectively, electrodes 8, 19 and 20 being respectively negative, positive and negative, while electrodes 21, 22 and 23 are respectively positive, negative, and positive. Guide rolls 25 of electrodes 19 and 20 serve to conduct current to wire 11, the wire thus being rendered anodic in tank 15 and again cathodic in tank 16. Gas burners 29 are provided for maintaining tank 13 in a heated condition.

Tank 13 contains a fused bath of sodium hydroxide through which the wire passes. Current is passed through the fused bath to electrolyze it, electrode 8 serving as the cathode. In this specific example of my invention, the wire passes through the bath at such a rate that each portion thereof remains immersed in the fused bath for a period of about thirty seconds.

From tank 13 the wire passes through wash water in tank 14 to remove the adherent sodium hydroxide, then passing through an aqueous solution of sulphuric acid in tank 15, the concentration of this being 20% $H_2SO_4$. Here the wire acts as the anode, the current density employed being of the order of 100 amperes per square foot or greater.

The wire next passes through an aqueous solution of zinc sulphate and sulphuric acid in tank 16, the zinc sulphate being in such an amount as to give a zinc content of 7 grams per 100 cubic centimeters of solution and the sulphuric acid about 20%. Here the wire acts as the cathode, the current density being of the order of 200 amperes or greater per square foot of cathodic surface. Here the wire is electroplated with zinc. For the anodic treatment in tank 15, the same composition may be employed as that in the coating of plating tank 16.

The anodic treatment of the wire in tank 15 may be effected with an electrolyte of substantially the same composition as the plating electrolyte in tank 16. It is to be understood, of course, that the most significant constituent of this electrolyte used in tank 15 is the sulphuric acid.

The treatment in tank 13 is the most significant stage of the process so far as this particular patent application is concerned. This treatment effectively cleans the surface of the wire, fully removing those obstacles to effective coating of ferrous metal. Moreover, this treatment produces a "passive" condition of the surface of the metal. This passivity of the metal surface gives it a considerable degree of resistance to corrosive influences.

For instance as shown in the drawing the tank 13 containing fused NaOH maintained heated by the jets 29 may have its two anodes 21 on the sides and its cathode 8 on the tank bottom, these electrodes receiving current from the generator 26 and electrolytically supplying elemental sodium to the caustic bath which is maintained at a temperature sufficiently above the fusing point of the sodium hydroxide so that the sodium liberated at the cathode 8 is dissolved or diffused in the molten caustic at a rate sufficient to supply sodium for the cleaning of the wire. The wire 11 is run through the bath under guide rollers 25 unconnected in the electrical circuit, the holders or brackets 18 being a mere mechanical support for the roller. In this way the wire is submerged in the caustic solution of sodium at a temperature above the fusion point of the caustic for sufficient time to remove the oxides, scale and the like from the wire while in the bath. Upon emerging from the bath the wire is free of oxides and the like and upon removal of the adhering film of caustic the wire surface is conditioned for further treatments referred to in connection with the electrolytically treated metal. The caustic may be replaced by compounds of other alkali or alkaline earth metals and the various temperature controls may be applied as in the electrolytic treatment of the article together with the avoidance of the formation of the oxide coating as previously set forth.

While wire has just been given as an example of an article which may be advantageously treated by the process just described, it is evident that metal articles generally may be treated by the cleaning operation in fused sodium hydroxide whether the articles are to be fed continuously through the fused bath, as in the case of wire, or are to be treated intermittently. Obviously, the application of the fused bath treatment is not limited to articles which are to be zinc coated as in the specific illustration just given. The method is applicable wherever it is desired to obtain an effectively cleaned metal surface. This type of cleaning is especially effective as a preparation of metal surfaces for subsequent coating operation, whether electrolytic or otherwise, including enameling and the like, but its application is as wide as the need for effectively cleaned metal surfaces.

The cleaning effect produced by the process set forth above is due to the reducing action of the elemental sodium on the compounds, such as oxides, on the surface of the iron or steel being treated.

For the most effective results, the treatment with the fused sodium hydroxide should be so carried out that the elemental sodium liberated does not collect in sensible amounts, preferably not in visible amounts, upon the article being treated. To effect this result, I employ conditions during electrolysis such that the sodium as fast as it is separated from the sodium hydroxide, in the elemental state, is dissolved by or diffused into the bath of sodium hydroxide, and consequently does not gather or collect upon the surface of the cathode.

Under such conditions the article is bathed by a solution of sodium in sodium hydroxide which acts reducingly upon any compounds on the article's surface.

If conditions were to be used which would cause the collection of sensible amounts of sodium on the cathode, as is done in the known processes for electrolytic recovery of metallic sodium, the action of the sodium upon the article being treated would not be so effective as when the procedure just outlined is followed. If sodium is deposited in sensible amounts upon the article, it is practically impossible to get uniform reduction of the oxides and other compounds upon its surface. The sodium collects irregularly upon the surface, appearing as globules here and there, and as soon as a portion of the cathode surface receives a film of sodium, the rate and depth of reduction in that portion is immediately diminished because the collected sodium is not so effective a reducing agent as nascent sodium or sodium in solution, and since the film protects the surface from the direct action of nascent and dissolved sodium. Moreover, the conditions necessary for depositing sodium in sensible amounts upon the cathode are such that the sodium hydroxide surrounding the article being treated contains little, if any, sodium in solution. Consequently, even those portions of the article's surface which are not covered by a film of sodium are not so quickly and effectively subjected to the action of the sodium.

Another factor which would intererefe with getting the best results, when sodium is deposited in sensible amounts upon the article, is that of reoxidation. Elemental sodium rapidly forms oxides when brought into the air, the oxides of sodium being very powerful oxidizing agents. When a ferrous or other metal article, having globules of sodium upon its surface emerges from the fused bath, oxides of sodium are quickly formed which immediately reoxidize portions of the article's surface.

The most easily imposed conditions for effecting the treatment with sodium without collecting sensible quantities of sodium on the surface of the article being treated is by control of the temperature of the fused bath of sodium hydroxide. I maintain this fused bath at a temperature above that at which sodium collects upon the cathode. By keeping the bath at temperatures more than 20° C. in excess of the melting point of sodium hydroxide, the sodium is prevented from collecting on the cathode.

Preferably I employ the sodium hydroxide bath at a minimum temperature of 350° C., but, as implied above, I may go as low as a temperature just in excess of 20° above the melting point of the sodium hydroxide. Consequently I may use a temperature as low as just in excess of 338° C. in the case of pure sodium hydroxide. Since most commercial sodium hydroxides are more or less impure, their melting points are lower than that of the pure hydroxide, ordinarily ranging from about 295° C. to 300° C.; consequently with these impure sodium hydroxides I may operate at somewhat lower temperatures, if desirable, namely at temperatures which are just in excess of 315° C. to 320° C.

Thus far we have considered the minimum temperature at which the fused bath of sodium hydroxide is used. It is frequently desirable to operate at fairly high temperatures and this may be successfully done. The fused bath may combine the function of annealing the metal articles with that of its cleaning action thereon. Steel wire, for example, is commonly produced by being "cold drawn" which operation introduces more or less stresses or strains. By operating the fused bath at a sufficiently elevated temperature these conditions may be entirely relieved. With this additional function of annealing, or for that matter any desired form of heat treatment, the fused bath will be used at temperatures best adapted to the particular material and purpose involved.

High chromium steels, including the so-called

"stainless steels" such as the well known "18–8" (18% chromium and 8% nickel), are advantageously treated by my cleaning process. In treating these high chromium steels it is usually well to employ temperatures of the order of 538° C.

A very important aspect of my invention relates to the control of conditions to avoid or nullify the disadvantage of reoxidation of the surface of the metal being treated. I have discovered that unless certain precautions are taken the metal quickly oxidizes upon removal from the cleaning and deoxidizing bath. If, in the operation of the process given above as an example of my invention, the bath of sodium hydroxide is maintained at a temperature substantially above 550° C. the surface of the iron or steel becomes oxidized when it passes from the fused sodium hydroxide in tank 13 into the air. This condition can frequently be obviated by maintaining the fused bath of sodium hydroxide at a temperature below 550° C., at 500° C., for example. By using the cleaning bath at this temperature the oxidation of the treated metal is usually avoided by preventing at the outset the condition of the steel surface which leads to oxidation. As will be apparent later in this specification, it is feasible under certain circumstances to operate the fused cleaning bath at temperatures which normally render the metal easily oxidizable and then to subject the metal being treated immediately to conditions which will overcome the tendency to oxidize.

In carrying out the process above described, it may be useful in some cases to employ temperatures of the fused bath in excess of 550° C. It may be desired, for example, to effect an annealing of wire in the fused bath at a temperature say of 600° C. If such a temperature of the fused bath is employed in tank 13 the surface of the wire will oxidize when it enters the air. The oxides on the surface, thus produced, however, are not so closely adherent as those which normally occur on ferrous surfaces and they may easily be removed by a relatively mild pickling operation in an aqueous acid bath, such a pickling operation being much more easily and inexpensively carried out than if the metal had not previously been subjected to the fused bath treatment. Of course, when the article, after its treatment in the sodium hydroxide bath, is given a treatment such as the anodic treatment illustrated in Figs. 1 and 2, the oxides are effectively removed.

But while it is practicable to thus remove the oxides formed on the wire or other metal I prefer in most cases to proceed in such manner as to prevent their occurrence. In the process involving the anodic treatment the removal of the oxides by the anodic operation has a disadvantage in that to effect their complete removal it is usually necessary to prolong the anodic treatment thus slowing up the entire process. Accordingly when I employ such temperatures of the fused bath as produce the tendency to ready oxidability I find it advantageous to use some form of procedure which will nullify this tendency. For instance I may employ a type of furnace for heating the pot which permits concentration of heat at the input end and allows the temperature at the exit end to remain considerably lower.

It is possible to secure the combined annealing and cleaning in the higher temperature portion of the bath, and by passing the wire or other metal article through the lower temperature portion to overcome to a very substantial degree the tendency of the metal to reoxidize. Or a stream of steam may be discharged across the surface of the fused bath and also across the wire as it issues from the fused bath.

I have also discovered that agitation of the fused bath serves to overcome the tendency of the metal to oxidize. Even in the absence of means for cooling the exit portion of the bath and of the treatment of the metal and bath with steam, the tendency to oxidation may be substantially or even completely overcome if the fused bath is sufficiently agitated.

Other means for preventing the rapid oxidation of the metal as it leaves the fused cleaning bath may be employed. The oxygen in the air appears to be a factor in the reoxidation of the metal as it leaves the fused bath. By providing an atmosphere of a non-oxidizing gas, particularly one having a reducing action, reoxidation is substantially or entirely prevented.

Instead of working with the higher temperatures of the bath which give the tendency to active oxidation, it is of course practicable to employ the lower temperatures and effect an annealing by previously passing the wire or other article through a lead bath or other suitable medium at the appropriate annealing temperatures.

My process is not limited in its application to sodium hydroxide. Other compounds of sodium may be used, or mixtures of different compounds. Nor is my process limited to the use of compounds of sodium. Compounds of the other alkali metals may be used, those of potassium being particularly suitable. I may also use compounds of the alkaline earth metal group including magnesium, those of calcium being economically advantageous. Hereafter, when referring generically to these various metals and their compounds, I shall usually designate them as "highly electropositive metals" or compounds thereof.

Not only with sodium hydroxide but with other compounds of sodium as well as compounds of the other metals of the alkali metal group the metals of the alkaline earth group, I prefer to operate at temperatures substantially above their melting points. I find that the reducing action of these highly electropositive metals is much more effective if the operating temperature of the bath is substantially in excess of the melting point of the compound or mixture of compounds which is used. Ordinarily the operating temperature of the bath should be in excess of twenty degrees above the melting point of the bath. By so proceeding, I find that I avoid the superficial reduction of compounds which may occur if lower temperatures are used, moreover the resulting reduced metal is much more easily detached than if the lower temperatures were to be used.

By selection of the proper compound for the fused bath or by a mixture of compounds, a wide variety of effects may be produced, thus enabling one to select the conditions most suitable for his particular material and problem. For example, if lower temperatures of operation, than those securable by the use of sodium hydroxide, are desired, such temperatures can be obtained by the use of compounds of lower melting points, such, for example, as sodium nitrite (fusing at 213° C.), either alone or mixed with sodium hydroxide. By the judicious mixing of various sodium and potassium salts, as is well known, a rather wide range of fusion points may be secured.

It will be obvious to the electro-chemist that the working conditions must frequently be altered with a change in the character of the fused bath employed. If a chloride of a highly electropositive metal were to be used, for example, it would be necessary that the anodes used should be of some material resistant to the action of chlorine.

Usually in carrying out my cleaning operation it is important to maintain the fused bath relatively constant in composition or at least to allow variations only within definite limits. If there is undue variation in the composition of the fused bath the temperature will vary unduly. If, for example, sodium hydroxide is used for the bath undue formation of sodium carbonate through absorption from the air of carbon dioxide will lead to such an elevation of the melting point of the bath as to give bath temperatures too high for the most satisfactory operation of my process. Where, for instance, it is desired to operate the bath of sodium hydroxide at a temperature below 550° C. to prevent the ready oxidability of the metal, it is necessary that means be provided to prevent the absorption of such an amount of carbon dioxide as will raise the melting point above the desired operating temperature. The carbonate content of the fused bath will of course depend upon the rate of removal of the mixture of sodium hydroxide and sodium carbonate upon the surface of the metal being treated, the rate of replenishment of the fused bath by the addition of pure sodium hydroxide, and the rate of absorption of carbon dioxide. The most effective way of keeping the carbon dioxide absorption at the necessary minimum is by providing a cover for the fused bath cleaning tank.

The loss of sodium hydroxide, or other bath constituent, from the fused bath, due to its being carried away on the surface of the article treated, may be minimized in various ways as by wiping the wire or other article as it issued from the bath.

As a result of the article being surrounded by a solution of the reducing metal, all portions of the article's surface can be effectively treated.

I am thus able to reduce oxides, and other compounds, effectively when the article being treated does not act as cathode. By producing a solution of the highly electro-positive metal an article in the fused bath may be subjected to the reducing action of the solution even though such article is in no way electrically connected with the cathode.

Accordingly, my invention, in its broader aspect, includes the idea of subjecting metal articles to a solution of highly electro-positive metal in a fused bath. For example, articles having highly oxidized surfaces may be effectively cleaned by immersing them for a substantial time in a solution of sodium in fused sodium hydroxide, regardless of how the solution is prepared, whether electrolytically or otherwise. The solution obviously may be prepared in various ways. Elemental sodium may be gradually added to a fused bath of sodium hydroxide in any manner desired. Probably the most effective way to maintain a solution of sodium in the hydroxide is by introducing it in the manner already pointed out, namely by electrolyzing a solution of sodium hydroxide at a sufficiently elevated temperature to cause the liberated sodium to diffuse into the fused bath.

My process is not limited to the treatment of ferrous metals. Articles of various metals may be efficiently cleaned by subjecting them to the action of metals having a greater affinity for oxygen than the metal being treated.

For example, I have effectively cleaned articles of copper, bronze, and nickel-chromium alloys by using them as cathodes in the electrolysis of a fused bath of sodium hydroxide. It will be readily appreciated that the essential principles of this invention may be applied to metals generally, varying, as desired and as special conditions demand, the details of the operation.

My process may be effectively utilized to produce sponge metal. For example, my process is very effective in treating all ferrous material which has exceedingly heavy amounts of scale. When such material is subjected to my operation, as for instance, when treated in a caustic soda bath, as above outlined, the sodium, in solution in the caustic soda, quickly and thoroughly reduces the heavy scale to sponge iron. This sponge iron may be easily removed by well known operations, such as scraping, and by the use of water sprays. The sponge iron thus removed is an important industrial product and it is frequently economically advantageous to utilize such material where heavily oxidized material is treated on a large scale.

I have already indicated that the fused bath may be so used as to combine with its function of cleaning that of effecting the heating stage of heat treatments, such as annealing. These heat treatments are various. Many of them, such as most forms of normalizing include the step of heating the metal above the "critical temperature." The fused bath, which is used for cleaning the metal, may well be employed for the heating step of such heat treating operations. If the desired temperature is a very high one care should be taken to employ such a compound as will not react with the metal being treated at the elevated temperature. For example, I have found that in the combined heat treatment and cleaning of ferrous articles a mixture of 50% potassium chloride and 50% sodium carbonate may be used at considerably higher temperatures than sodium hydroxide.

Frequently I find it advantageous to subject the article to be cleaned to an oxidizing treatment prior to the reducing action of the highly electropositive metal.

The treatment of the article without current accomplishes the deoxidation of the oxides, scale and the like within the bath, and it is understood that the treatment without current may be preceded by and followed by the electrolytic and oxide-preventing treatments.

In the specification and claims, electrode means either terminal of an electric source by which the current enters or leaves the electrolyte.

This application is a division of my co-pending application Serial No. 236,340, filed October 21, 1938, which application is in part a continuation of application Serial No. 630,233, filed August 24, 1932, application Serial No. 692,378, filed October 6, 1933, and application Serial No. 128,682, filed March 2, 1937, now Patent No. 2,134,457, dated October 25, 1938.

I claim:

1. In a process for treating a solid metal article to remove oxides, scale and the like, the steps of providing a bath of a molten compound of a metal from the group consisting of the alkali and alkali earth metals and containing in solution a metal also from said group and electropositive relative to the treated metal of the article, introducing said article in solid form into said bath without connection of said article as an electrode of an electric source supplying current to the bath, said article being solid at the temperature of the bath, maintaining said bath at a temperature below the boiling point of said treating metal and sufficiently high above the fusion point of the molten compound to maintain said supplied metal in solution in said bath at the area of contact with said article whereby to avoid a deposit of said treating metal on said article, continuing said treatment for a sufficient length of time with sufficient treating metal in solution and without connection of the article as an electrode of an electric source to complete the desired reduction of the oxides, scale and the like in the bath without dependence on current through the article as an electrode of an electric source and without accumulation of deposit of said treating metal on the article, and removing the article from the molten bath.

2. The process of claim 1 in which oxides are incompletely reduced in the bath and the article after delivery is subjected to treatment in an aqueous acid bath to remove oxides adhering to the surface of the delivered article.

3. The process of claim 1 in which the article at delivery has been subjected to surface oxidation and is subsequently treated with an aqueous acid bath to remove the adhering oxides.

4. The process of claim 1 in which the treated metal is freed from actively oxidizing material by a fluid bath on the treated metal before said metal is brought into the free atmosphere.

5. The process of claim 1 in which the treated metal at the delivery surface of the molten bath is bathed in an atmosphere of steam.

6. The process of claim 1 in which the bath is stirred to agitate it at the point of delivery of the article therefrom.

7. The process of claim 1 in which the fused bath is of a solution of sodium in sodium hydroxide maintained at a temperature between 350° C. and 750° C.

8. The process of claim 1 in which the bath contains a treating metal of the group sodium, calcium, potassium and magnesium.

9. The process of claim 1 in which the desired amount of treating metal in solution is maintained by the addition of said treating metal in elemental form from time to time.

10. The process of claim 1 in which the supply of metal for the molten bath is from a cathode suspended in the bath and in electrical circuit with an anode in the bath.

URLYN CLIFTON TAINTON.